June 9, 1953 S. F. GABRIELE 2,641,479
ELECTRIC DRILL ADAPTER KIT
Filed June 29, 1951
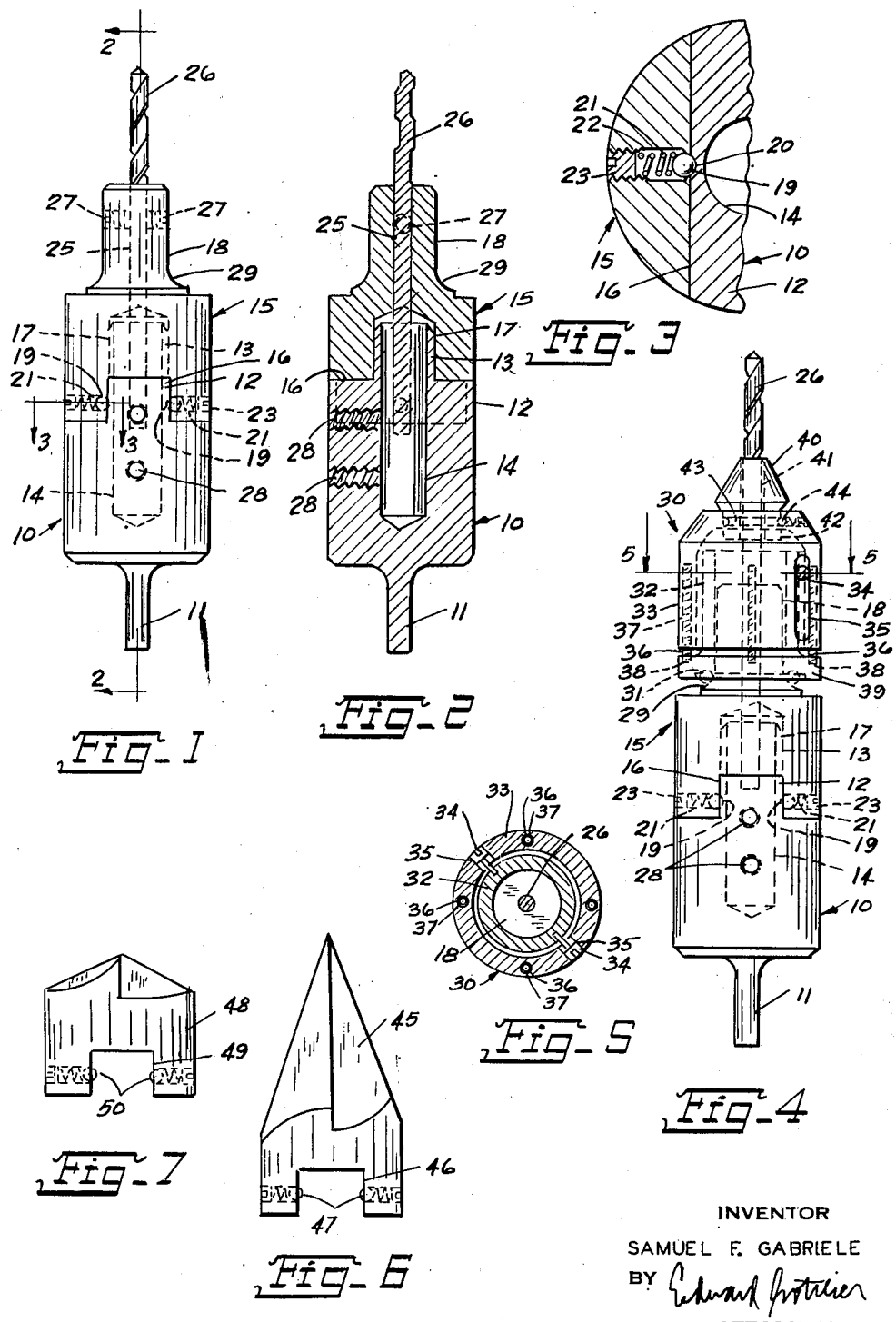
INVENTOR
SAMUEL F. GABRIELE
BY
ATTORNEY Patented June 9, 1953

2,641,479

UNITED STATES PATENT OFFICE 2,641,479

ELECTRIC DRILL ADAPTER KIT

Samuel F. Gabriele, Brooklyn, N. Y.

Application June 29, 1951, Serial No. 234,339

3 Claims. (Cl. 279—76)

This invention relates to new and useful improvements in electric drill adaptor kits.

Heretofore, attempts have been made to produce commercial electric drill adaptor kits because their need was recognized. In repair shops, factories and other places there is a great need for a quick change of drill bits, counterbores and countersinks. At the present time the drill chucks are opened and closed with the use of keys. Valuable time is wasted when drill bits and counterchucks are replaced in the drill chucks. Each time it is necessary to open the drill chucks with the keys, make the necessary changes, and then reclose the drill chucks.

Prior attempts which have been made to produce electric drill adaptor kits failed, in my opinion, because of the additional length and bulk added between the drill chuck and the drill bits and counterbores. This additional length and bulk of the kits tends to increase the whipping of the drill bits and consequently their snapping and breaking. Even without the use of electric drill adaptor kits it is a problem to use small size drills without breaking the drill bits. In fact, it requires a great deal of skill on the part of the operator.

The dominating object of this invention resides in the construction of an electric drill adaptor kit which provides for quick changes between different drill bits, countersinks and counterbores, and which is so constructed that whipping and snapping of the drill bits is materially reduced or entirely eliminated. It is true that the new electric drill adaptor kit, in accordance with this invention, adds bulk and length between the drill chuck and the drill bit. However, the new adaptor kit is provided with an arrangement which allows the drill bit to be set into the adaptor any desired amount. For example, it is possible to expose only 1/8" of the end of the drill bit, or 1/2", or any desired amount. With this construction drilling of a hole may be done in sections. First a small portion of the drill bit may be extended for use, then as the drilling progresses, larger and larger portions may be extended until the hole is completely drilled. It should be recognized that because the drill bits may be set into the adaptor any amount desired it is possible to eliminate whipping of the drill bit during operation and so eliminate snapping.

Specifically, this invention proposes the use of a master chuck having at its bottom a stem for engaging into a drill chuck, and a series of drill bit holders for holding drill bits of different sizes.

A simple, efficient connection is provided whereby any one of the drill bit holders may be snapped on and pulled off of the master chuck. This permits quick change between the different drill bit sizes. The master chuck is mounted in the drill chuck just one time by operating the usual key which works the master chuck. Thereafter the different drill bit holders with the drills mounted in them may be snapped on and pulled off the master chuck. It is also proposed to provide counterbores and countersinks which may also be snapped on and pulled off the master chuck. It should be recognized that with this arrangement there is no need for operating the key of the drill chuck each time a drill bit or counterbore or countersink is changed.

An important improvement of the master chuck and drill bit holders, in accordance with this invention, resides in providing the master chuck with a diagonal key projection at its top, a tube projecting from the top of said key projection, and a bore extending from said tube down into the master chuck. The drill holders are provided at their bottoms with diagonal slots for engaging on said key projection, and bores into which said tube may engage. Each drill bit holder has a cylindrical projection at its top and means for releasably holding drill bits projected selected amounts from said top cylindrical projection. Means is provided for releasably holding the drill bit holders on the master chuck so that they may be snapped on and pulled off as desired. Each drill bit holder also has an axial opening into which the drill bit may engage in order to project from the top of the drill bit holder. These axial openings are also so arranged that the bottom ends of the drill bits may extend down and through the tube and into the bore of the master chuck.

Another object of this invention resides in constructing each drill bit holder at its top portion with a bearing support shoulder. A stationary drill bit support is turnably mounted on the drill bit holder and comprises an inner collar engaging over the cylindrical projection of the drill bit holder and provided with a bearing engaging said bearing support shoulder. An outer collar is longitudinally slidably mounted on the inner collar and resilient means is provided for urging the outer collar to an out position on the inner collar. A drill bit steadying member, one for each drill bit size, is releasably mounted on the outer collar and is provided with an axial opening through which the drill bit may pass. This stationary drill bit support device is used to steady each drill bit while it is being used so as to prevent whipping and snapping.

It should be recognized that this invention primarily distinguishes from prior drill bit adaptor kits in the fact that it incorporates an arrangement to prevent whipping and snapping of the drills.

Another object of the invention is the construction of a device as described, which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a drill bit adaptor constructed in accordance with this invention, and shown with but one drill bit holder provided with a drill bit.

Fig. 2 is a vertical sectional view taken on the line 2—2 of Fig. 1.

Fig. 3 is a fragmentary enlarged horizontal sectional view taken on the line 3—3 of Fig. 1.

Fig. 4 is an elevational view of the drill bit adaptor illustrated in Fig. 1 but shown provided with a drill bit support device for steadying the drill bit during operation.

Fig. 5 is a horizontal sectional view taken on the line 5—5 of Fig. 4.

Fig. 6 is an elevational view of a counterbore constructed to engage upon the master chuck shown in Fig. 1.

Fig. 7 is a side elevational view of a countersink constructed to engage upon the master chuck shown in Fig. 1.

The drill bit adaptor, illustrated in Figs. 1–3 inclusive, includes a master chuck 10 having at its bottom a stem 11 for engaging into a drill chuck and having at its top a diagonal key projection 12, a tube 13 projecting from the top of said key projection 12, and a bore 14 extending from said tube 13 down into said master chuck 10. A drill bit holder 15 is formed at its bottom with a diagonal slot 16 for said key projection 12 to mate in. The drill bit holder 15 is also provided with a bore 17 into which said tube 13 engages. The drill bit holder 15 also has at its top a cylindrical projection 18. Associated with the drill bit holder 15 and the master chuck 10 there is means for releasably holding these parts together. This means is characterized by one or more cooperative spring urged balls 19 and cooperative recesses 20 on said key projection 12 and diagonal slot 16. Each ball 19 is urged into each recess 20 by an expansion spring 21 housed in a bore 22. A set screw 23 holds each spring 22 in position. With this construction the drill bit holder 15 may be pulled off and snapped on to the master chuck 10.

The drill bit holder 15 is also provided with an axial opening 25 into which a drill bit 26 may engage in order that said drill bit 26 may project from the top of said drill bit holder 15 any desired distance, and in order that the bottom of said drill bit 26 may extend down through said tube 13 and into said bore 14 of the master chuck 10. The cylindrical projection 18 is provided with means for releasably holding the drill bit 26 in selected extended or retracted positions. This means comprises one or more set screws 27 threadedly engaging through the cylindrical projection 18 and adapted to abut and hold the drill bit 26. When the drill bit 26 is sufficiently retracted in the drill bit holder the set screws 27 will engage the flutes of the drill bit 26. Preferably, the set screws 27 should have left hand threads in order that there be a tendency for the set screws 27 to become tight during the operation of the drill and in this way securely hold the drill bit 26 in position.

The master chuck 10 is also formed with several tapped openings 28 for holding screws to engage and hold a drill or other tool set directly into the bore 14 when the drill bit holder 15 is not in use. The cylindrical projection 18 is formed at its base with a bearing support shoulder 29. A stationary drill bit holder support device 30 is mounted on the drill bit holder 15 and has a bearing 31 engaging said shoulder 29.

Said stationary drill bit support device 30 includes an inner collar 32 engaging over said cylindrical projection 18 and provided at its bottom with said bearing 31 for engaging said bearing support shoulder 29. An outer collar 33 is longitudinally slidably mounted on said inner collar 31. This slidable connection is formed by one or more projections or screws 34 on one of said collars slidably engaging longitudinal slots 35 on the other of said collars. Resilient means urges the collar 33 to an out position on the inner collar 32. This resilient means comprises a group of expansion springs 36 housed in openings 37 formed in the outer collar 33 and engaging downwards into small recesses 38 formed in a bottom flange 39 on the inner collar 32. The springs 36 will urge the outer collar 33 upwards, or outwards, of the inner collar 32.

A drill bit steadying member 40 is mounted on said outer collar 33 and is formed with an axial opening 41 through which the drill bit 26 passes. This drill bit steadying member 40 has a stem portion 42 engaging in an opening in the outer end of the outer collar 33. This stem portion 42 is formed with a circumferential recess 43 engaged by a spring pressed ball 44 by which the drill bit steadying member 40 is releasably held so that it may be pulled out from the outer collar 32 and snapped in whenever desired. The drill bit steadying member 40 is of conical shape having a chamfered bottom as shown in Fig. 4.

In Fig. 6 a countersink 45 is shown formed with a diagonal slot 46 the sides of which are provided with spring urged ball devices 47, the balls of which are adapted to engage the recesses 20 of the master chuck 10. In Fig. 7 a countersink 48 is shown provided with a diagonal slot 49 the sides of which are provided with spring pressed ball devices 50, the balls of which are adapted to engage recesses 20 of the master chuck 10.

The operation and use of the new drill bit adaptor kit may be understood from the following:

In Figs. 1 and 2 a drill bit adaptor is shown provided with a drill bit 26 which is extended out from the top of the cylindrical projection 18 a certain amount. If desired, the set screws 27 may be loosened and the drill bit 26 may be extended further out or set further in as desired. The bore 14 is deep enough so as to permit the drill bit 26 to be set in so that it extends but a small distance out from the cylindrical projection 18. The master chuck 10 is mounted upon a drill chuck in the usual way by opening the drill chuck with the usual key and then setting the stem 10 in position and retightening the chuck with the key.

It is proposed that a number of drill bit holders 15 be provided with drill bits 26 of different sizes. To change a drill bit it is merely necessary to pull off the drill bit holder 15 and then to snap on another similar drill bit holder 15 provided with a drill bit 26 of a different size. This change is much faster than opening and closing the drill chuck with the key and merely setting the drill bit into the drill chuck.

An important feature of the invention may now be clearly understood. It should be recognized that the master chuck 10 and drill bit holder 15 adds length and mass between the drill chuck and the drill bit 26. This additional length and mass has a tendency to cause the drill bit to whip and snap during a drilling operation. Prior inventors trying to commercialize drill adaptors made no provision for compensating for this additional length and mass. However, I have provided the bore 14 and a means for releasably holding the bit 26 so that it may be set down as far as needed in the drill bit holder 15. With this arrangement the drilling operation may be started with the drill bit 26 extended a very short distance from the cylindrical projection 18. For example, $\frac{1}{8}''$ or $\frac{1}{4}''$, or other distance desired. Because the drill bit is extended but a short distance it will not whip and snap. As the drilling operation proceeds the drill bit 26 may be extended further and further, as needed. Since now the drill bit extends into the drill hole it will be supported against whipping and snapping.

In Figs. 4 and 5 a supplemental stationary drill bit support device 30 is shown mounted on the cylindrical projection 18. With this device 30, the drill bit 26 may be initially set into the drill bit holder 15 extended a relatively large distance because now we can depend on the drill bit steadying member 40 to hold the drill bit 26 from whipping and snapping. The drill is used in the usual way with the exception that the operator holds the outer collar 33 which normally is extended the full distance permitted by the slots 35 and the projections 34. The operator forces the outer collar 33 inwards any desired distance so as to expose any amount of the drill bit 26 from the conical end of the drill bit steadying member 40. Initially, the tip of the drill bit 26 is extended and then as the drilling operation proceeds the outer collar 33 is manually forced further and further downwards so as to extend more and more of the drill bit 26. Thus the drill bit is securely held steady from whipping and snapping.

The stationary drill bit support device 30 may be pulled off and replaced on the cylindrical projection 18 whenever desired. When a drill bit holder 15 is replaced on the master chuck 10, the drill bit steadying member 40 is snapped out and a new similar one is snapped in position on the outer collar 33 to fit the size of the new drill bit being used.

The counterbore 45 and countersink 48 is used upon the chuck 10 by first removing the drill bit holder 15.

While I have illustrated and described the preferred embodiment of my invention, it is to be understood that I do not limit myself to the precise construction herein disclosed and the right is reserved to all changes coming within the scope of the invention as defined in the appended claims.

Having thus described my invention, what I claim as new and desire to secure by United States Letters Patent is:

1. A drill adaptor, comprising a master chuck for engaging into a drill chuck and having an axial opening, a drill bit holder engageable on said master chuck and having at its top a cylindrical projection formed at its base with a bearing support shoulder and having an axial opening into which a drill bit may engage in order to project from the top of said drill bit holder and in order that the bottom of said drill bit may extend down into said axial opening of said master chuck, means for releasably latching said drill bit holder on said master chuck, means for releasably holding said drill bit firmly connected with said cylindrical projection, and a stationary drill bit support mounted on said drill bit holder and comprising an inner collar engaging over said cylindrical projection and provided with a bearing engaging said bearing support shoulder, an outer collar longitudinally slidably mounted on said inner collar, resilient means urging said outer collar to an out position on said inner collar, and a drill bit steadying member mounted on said outer collar and having an axial opening through which said drill bit may pass.

2. A drill bit adaptor as defined in claim 1, in which a projection from one of said collars engages a longitudinal slot in the other of said collars for limiting sliding of said collars.

3. A drill bit adaptor as defined in claim 1, in which a cooperative spring urged ball and recess releasably holds said steadying member on said outer collar.

SAMUEL F. GABRIELE.

References Cited in the file of this patent

UNITED STATES PATENTS

| Number | Name | Date |
|---|---|---|
| 1,259,603 | Conord | Mar. 19, 1918 |
| 1,434,128 | Leopold | Oct. 31, 1922 |
| 2,338,095 | Campbell | Jan. 4, 1944 |
| 2,370,487 | Poutie | Feb. 27, 1945 |
| 2,497,426 | Toth | Feb. 14, 1950 |